United States Patent [19]

Sullivan et al.

[11] Patent Number: 5,423,912
[45] Date of Patent: Jun. 13, 1995

[54] WEATHER RESISTANT PEARLESCENT PIGMENTS

[75] Inventors: William J. Sullivan, Ossining; Deborah Cacace, Cold Spring, both of N.Y.

[73] Assignee: The Mearl Corporation, Ossining, N.Y.

[21] Appl. No.: 140,608

[22] Filed: Oct. 21, 1993

[51] Int. Cl.⁶ ............................................. C04B 14/20
[52] U.S. Cl. .................................. 106/417; 106/418; 106/439; 106/442; 106/459
[58] Field of Search .............. 106/417, 418, 439, 442, 106/459

[56] References Cited

U.S. PATENT DOCUMENTS

| | | |
|---|---|---|
| 4,146,403 | 3/1979 | Armanini et al. ............ 106/439 X |
| 4,405,376 | 9/1983 | Matsunaga et al. ................ 106/438 |
| 4,544,415 | 10/1985 | Franz et al. ........................ 106/288 |
| 4,737,194 | 4/1988 | Jacobson .............................. 106/300 |
| 4,744,832 | 5/1988 | Franz et al. ......................... 106/418 |
| 5,022,923 | 6/1991 | Rau et al. ............................ 106/415 |
| 5,091,011 | 2/1992 | DeLuca, Jr. ........................ 106/417 |
| 5,149,369 | 9/1992 | Eberts et al. ....................... 106/479 |
| 5,266,107 | 11/1993 | Hoffman ............................. 106/415 |

Primary Examiner—Mark L. Bell
Assistant Examiner—Scott L. Hertzog
Attorney, Agent, or Firm—Ostrolenk, Faber, Gerb & Soffen

[57] ABSTRACT

A titanium dioxide- or iron oxide-coated mica pearlescent pigment having a coating which contains a combination of hydrated cerium and aluminum oxides has enhanced weatherstability.

17 Claims, No Drawings

WEATHER RESISTANT PEARLESCENT PIGMENTS

BACKGROUND OF THE INVENTION

Formulation of a coating which is suitable for exterior use such as on the surfaces of an automobile is complex. The reason is that the coating must remain essentially unchanged in appearance over a period of several years while being exposed to a variety of weather conditions. The two major components of the coating are the vehicle and the pigment, and individually both can vary widely in stability properties.

Titanium dioxide is a most important pigment in such coatings and there is large quantity of literature on the methods and techniques to increase the stability properties of pigmentary titanium dioxide. Metal oxide-coated mica nacreous pigments such as titanium dioxide-coated mica, on the other hand, present a much more complicated entity than pigmentary titanium dioxide with respect to stability properties per se and to the coating exposed to the weather. Methods and techniques which are used to stabilize pigmentary titanium dioxide are either ineffective or insufficient to provide stability for titanium dioxide coated mica platelets.

The industry standard weatherstability testing is to subject coated metal panels to outdoor Florida weather for at least 2 or 3 years. The conditions prevalent there are most severe since the daily cycle includes the night with lower temperature and high humidity, possibly with some water condensation on the panels, a change to intense sunlight in the morning along with substantial temperature increases, the possibility of liquid water on the panel from rain in the afternoon followed by sunlight again and decreasing humidity, and finally the night again with falling temperatures and increasing humidity. This type of testing is especially common in connection with coatings intended for automotive use.

Since it takes such a long time to obtain meaningful outdoor exposure results, a number of accelerated weathering tests have been developed which can be completed in a much shorter period of time. These tests are used to screen potential candidates and determine whether the long term outdoor exposure testing should be conducted.

Three types of accelerated tests have evolved over the years. The first is a low temperature water immersion test (LTWI) where a pigment is incorporated in a paint system and then applied to a primed steel panel. The panel is then partially immersed in 35°-50° C. water for a week to ten days. After drying, changes in the immersed section of the panel relative to that part of the panel which was not immersed in the water are noted.

The second type of test commonly used is designed to evaluate the humidity or condensation resistance of the painted panel. A partially masked panel is placed in a condensation device such as the Cleveland Humidity Tester and subjected to 100–250 hours of condensation at 40°-60° C. At the end of the exposure period, changes in the exposed portion of the panel are compared to the unexposed portion of the panel which had been protected by the mask. Since the Cleveland tester is manufactured by the Q-Panel company, this test is commonly referred to as the Q-C-T test.

The third type of test involves exposing the panel to alternative cycles of UV radiation and condensation. Use is made of a laboratory instrument, the Q-U-V Accelerated Weathering Tester also made by Q-Panel, which provides cyclic weather conditions for coated metal panels so that in a 24-hour cycle, variations in near ultraviolet light, water condensation and temperature are presented to those panels. A typical Q-U-V cycle can be UV radiation for about 8 hours at 60°-70° C. followed by 4 hours of condensation at 50°-60° C. and the cycle is repeated over a period of 6 to 8 weeks. As in the other tests, changes in the exposed and unexposed portions of the panel are compared.

Many years of experience with these three accelerated tests have shown that products which fail any one of these tests will generally not pass the outdoor exposure testing. Unfortunately, experience has also demonstrated that the products which pass all three accelerated tests may not always pass the outdoor exposure testing. Because of this, some automotive paint suppliers and companies have begun to rely on an additional new accelerated test which must be satisfactorily completed before the outdoor exposure testing will be begun. This much more severe test involves immersing panels in 80° C. water for 8 to 24 hours.

The initial treatments which were employed to stabilized pearlescent pigments for use in exterior applications involve the use of chromium. For example, U.S. Pat. No. 3,832,208 describes the use of methacrylatochromic chloride and U.S. Pat. No. 4,134,776 describes the use of chromium hydroxide. While such chromium treatments were satisfactory, there has been a movement away from the use of chromium in recent years because of the potential impact of chromium on the environment, the hazards of hexavalent chromium and its slightly greenish color. Accordingly, a demand developed for a non-chromium treatment for stabilizing pearlescent pigments. A number of non-chromium treatments were developed and provide products which are able to withstand the low temperature water immersion test, the Q-C-T condensation test and the Q-U-V radiation condensation test. Because of industry demands, these new non-chromium treatments must now also withstand the harshness of being immersed in 80° C. water for an extended period of time in order to achieve sufficient acceptance by automotive paint companies to justify outdoor testing.

Canadian patent 664,268 which issued in 1963 discloses that the photoactivity of pigmentary rutile $TiO_2$ pigments in plastic resins could be reduced by treating the pigmentary $TiO_2$ with a combination of aluminum, cerium and silica. The patent notes that only a combination of the three components provides the stability increase. Data is set forth which shows that treatment of the calcined pigment with cerium alone, the combination of silicon and aluminum or silicon and cerium or aluminum and cerium resulted in degradation relative to untreated calcined pigment.

In the 1980s, U.S. Pat. Nos. 4,461,810 and 4,737,194 taught that pigmentary titanium dioxide coated with alumina could be stabilized with cerium provided sulphate, phosphate, silicate, borate or water soluble polyfunctional organic acid anions were also present.

U.S. Pat. No. 4,544,415 discloses pearlescent pigments based on metal oxide coated mica could have their weather resistance improved by coating the metal oxide with a top coat which contains a polysiloxane and a rare earth metal compound, preferably a compound of cerium. It was noted that the further addition of aluminum and zinc hydroxides reduced, in many cases, the tendency of the pigments to agglomerate and improved dispersability.

Published European patent application 342,533 relates to weather resistant pearlescent pigments in which metal oxide coated mica is overcoated with hydrated zirconium oxide and hydrated metal oxide in which the metal is cobalt, manganese or cerium. The published application indicates that additional stability can be obtained by adding hydrates, oxides or silicates of aluminum and/or zinc and that even better stabilities can be achieved by adding a siloxane coupling agent.

The object of the present invention is to provide new pearlescent pigments which do not contain chromium which can withstand not only the LTWI, Q-C-T and Q-U-V accelerated tests but can also withstand the harshness of the 80° C. water immersion test. This and other objects of the invention will become apparent to those of ordinary skill in this art from the following detailed description.

SUMMARY OF THE INVENTION

This invention provides pearlescent pigments of iron oxide or titanium dioxide coated on mica with enhanced water resistance by coating with a combination of hydrated cerium and aluminum oxides.

DETAILED DESCRIPTION OF THE INVENTION

In accordance with the present invention, a pearlescent pigment having enhanced weatherstability is realized by coating an iron oxide-coated mica or titanium dioxide-coated mica pearlescent pigment with a coating consisting essentially of a combination of hydrated cerium and aluminum oxides. The fact that this pigment has the ability to withstand the harshness of the 80° C. water immersion test is especially surprising. A number of other surface treatments were investigated. These included zirconium oxide; zirconium hydroxide; zinc oxide; zinc hydroxide; cerium oxide; cerium hydroxide; aluminum oxide; aluminum oxyhydroxide; cobalt oxide; cobalt hydroxide; alumina and silica; zirconium and aluminum hydroxides and oxides; zinc and aluminum oxyhydroxides; hydroxides and oxides of zirconium combined with oxides and hydroxides of $Ce^{+3}$ or $Ce^{+4}$; zirconium and silica; zirconium and phosphate; zinc and phosphate; $cerium^{+3}$ or $cerium^{+4}$ with silica or phosphate; zirconium, aluminum or zinc with polysilanes; and zirconium or zinc with polysiloxanes. All of the foregoing treatments gave unsatisfactory results in the 80° C. water immersion test. When oxides and hydroxides of cerium and aluminum were applied separately to the pigment, neither improved the resistance of the pigment during the 80° C. water immersion test. Overcoating with hydroxides and oxides of zirconium, zinc and cobalt were also insufficient. With some cerium compounds, it was possible to get a smooth coating but the stability was poor and the cerium treated products showed significant changes even after exposure to the low temperature water immersion test. The most successful of these other treatments used aluminum oxyhydroxide but the stability in the 80° C. water test was quite poor.

In the present invention, an iron oxide- or titanium dioxide-coated mica pearlescent pigment is overcoated with the cerium and aluminum. These pearlescent pigments are well known in the art and can be prepared by any known process. For a description of these pigments see, for example, Linton U.S. Pat. Nos. 3,087,828 and 3,087,829 and DeLuca U.S. Pat. No. 4,038,099. The pearlescent pigment is dispersed in a liquid from which cerium and aluminum can be readily precipitated onto the surface of the pigment. Conveniently, and preferably, an aqueous dispersion is employed. The concentration of the solid pigment in the dispersion is not critical but generally ranges from about 5 to 30% and preferably about 10 to 20%.

The cerium and aluminum are each added to the dispersion in the form of a salt which is soluble in the liquid medium. While the nitrate salts are preferred, other anions such as chloride, sulphate, and the like can also be used. The cerium salts can have the cation in either the (+3) or (+4) valence state. While the amount is not critical and is to a great extent dictated by solubility characteristics, it is preferred to employ about 0.1 to 1.5% cerium hydroxide (calculated as wt % Ce), and most preferably about 0.2 to 0.6% and about 0.1 to 1% aluminum hydroxide (calculated as wt % Al), most preferably about 0.2 to 0.6%, based on the weight of the pigment.

The cerium and aluminum salts can be added individually in either order and precipitated or can be added simultaneously and precipitated. It is preferred to employ simultaneous addition and precipitation because of its ease and efficiency. The precipitation of the cerium and aluminum hydroxides on the pearlescent pigment base is controlled by raising the pH to a value greater than about 5 and preferably to a value of about 5.5 to 7.5. In the simultaneous addition, the pH of the dispersion containing the pearlescent pigment is reduced below 5 and then, following addition of the cerium and aluminum, raised above 5 by addition of a base to precipitate the cerium hydroxide and aluminum hydroxide onto the pigment surface. Alternatively, precipitation at a constant pH can be achieved by simultaneously adding base as the cerium and aluminum salts are added. The nature of the base is not critical although the use of sodium hydroxide and ammonium hydroxide is preferred because of the ready availability of these bases.

The precipitation is usually effected at elevated temperature of from about 40° to 90° C. and preferably about 65° to 85° C. After completion of the precipitation step, the treated pearlescent product is separated from the dispersion by any convenient means such as, for instance, filtration, centrifugation or settling, washed and dried at a temperature of about 60° to 150° C., preferably about 80° to 120° C.

In order to further illustrate the present invention, various non-limiting examples are set forth below. In these, as throughout the specification and claims, all temperatures are °C. and all parts in percentages are by weight, unless otherwise indicated.

In the four accelerated weatherstability tests employed, primed 7.5 cm.×15 cm. steel panels (ED 11, supplied Advanced Coating Technologies of Detroit, Mich.) were coated with a 15-20 micron thick pigmented base coat. The pigmented base coat was prepared by dispersing 15 grams of pigment in 100 grams thermosetting acrylic resin. The base coat was allowed to flash and then a clear top coat of the same thermosetting resin was applied to a thickness of 30 microns. The resulting panel was then baked at 140° for 20 minutes. In each of the four accelerated weatherstability tests, the exposed portion of the panels was compared to a non-exposed portion.

In the low temperature water immersion test (LTWI), the painted panels were partially immersed in 40° C. water for 10 days. In the Q-C-T test, partially masked panels were placed in the Cleveland chamber and exposed to water condensation of 50° C. for 96 hours. The Q-U-V test was carried out by placing partially masked panels in the chamber and exposing them to alternate cycles of 8 hours of UVA-351 radiation and 4 hours of water condensation for 8 weeks. In the 80° C. water test, the baked panels were partially immersed in water maintained at 80° C. for a period of 24 hours, which was then allowed to cool to room temperature before the panel was removed.

Changes in appearance between the exposed sections of the panel and the unexposed section were evaluated by making distinctness of image (DOI) measurements using a Dorigon II Distinctness of Reflected Image Goniospectrophotometer manufactured by HunterLab. The retained distinctness, designated "% DOI" below, was calculated by dividing DOI after immersion by DOI before immersion and multiplied by 100. Pigments with a higher % DOI have better stability than those with a lower % DOI.

Additional changes in appearance of the panels were characterized by measuring the CIE L*a*b* values. This system is described in the text "The Measurement of Appearance", Second Edition, Hunter and Harold, Editors, John Wiley & Sons, 1987. Briefly this system involves measuring a lightness-darkness component designated L*, a red-green component designated a* and a yellow-blue component designated b*. The difference in color, designated DE*, was calculated using the equation $DE^* = [(DL^*)^2 + (Da^*)^2 + (Db^*)^2]^{\frac{1}{2}}$ in which DL*, Da* and Db* represent the difference in L*, a* and b* values between the exposed and unexposed section of the panel. The higher the value of DE*, the greater the change in appearance between the exposed and unexposed sections of the panel. In general, differences of less than 1 unit cannot be observed visually, that is, no difference can be seen between the exposed and unexposed sections of the panel.

Example 1

One hundred grams of a titanium dioxide-coated mica pigment containing 52% rutile TiO$_2$ and 48% muscovite mica which had a blue interference color and median particle size of about 20 μm were dispersed in one liter of water and heated to 75° C. The pH was adjusted to 6 with dilute nitric acid. Then 60 ml of an aqueous solution containing 0.7% Ce(NO$_3$)$_3$.6 H$_2$O which had been prepared by dissolving 1.2 gm of Ce(NO$_3$)$_3$ hexahydrate in 60 ml of distilled water, and 60 ml of aqueous solution containing 0.5% Al(NO$_3$)$_3$ which had been prepared by dissolving 4.2 gm of Al(NO$_3$)$_3$.9 H$_2$O in 60 ml of distilled water, were added over 10 minutes. The pH was maintained at 6 during the cerium and aluminum additions by simultaneously adding a dilute aqueous solution of sodium hydroxide. After stirring for 30 minutes, the suspension was filtered, washed with distilled water and then dried at 80° C. to yield a product containing 0.4% cerium hydroxide (calculated as Ce) and 0.2% aluminum hydroxide (calculated as Al).

The resulting pigment and the untreated starting pigment were tested in the LTWI, Q-C-T and Q-U-V tests. Visually, the untreated pigment showed more noticeable changes in appearance than the cerium-aluminum stabilized pigment. In the 80° C. water immersion test, the treated pigment exhibited only a very slight change in appearance while the untreated starting material exhibited a large change in its overall appearance. The % DOI and DE* data for each of the four tests are set forth in the following table:

|  | LTWI | Q-C-T | Q-U-V | 80° C. |
|---|---|---|---|---|
| % DOI - Treated | 99 | 79 | 91 | 68 |
| % DOI - Untreated | 73 | 50 | 53 | 15 |
| DE* - Treated | 4.1 | 2.1 | 0.8 | 2.6 |
| DE* - Untreated | 14.1 | 15.2 | 0.7 | 13.6 |

Example 2

The procedure of Example 1 was repeated except that after heating to 75° C., the pH of the aqueous dispersion was adjusted to 4 with dilute nitric acid, the aqueous cerium and aluminum solutions were then added and after stirring for 30 minutes, the pH was raised to 7 by slowly adding a dilute aqueous sodium hydroxide solution over 1 hour. Like the product of Example 1, this pigment contains 0.4% Ce and 0.2% Al. The treated product exhibited very little change in appearance when compared to the unstabilized starting material when evaluated in the four accelerated weatherstability tests. The % DOI and DE* results are set forth in the following table:

|  | LTWI | Q-C-T | Q-U-V | 80° C. |
|---|---|---|---|---|
| % DOI - Treated | 99 | 98 | 97 | 58 |
| % DOI - Untreated | 73 | 50 | 53 | 15 |
| DE* - Treated | 3.2 | 4.6 | 0.5 | 2.7 |
| DE* - Untreated | 14.0 | 15.2 | 0.7 | 13.6 |

Example 3

The procedure of Example 1 was repeated except that the unstabilized pearlescent pigment was a white pearl titanium dioxide-coated mica containing 26% rutile TiO$_2$ and 74% muscovite mica and the drying was effected at 120° C. The resulting pigment exhibited much better stability than the untreated starting material after LTWI, Q-C-T and Q-U-V tests. The treated product also showed very little change in appearance relative to the starting material after the 80° C. water immersion test. The test data was as follows:

|  | LTWI | Q-C-T | Q-U-V | 80° C. |
|---|---|---|---|---|
| % DOI - Treated | 98 | 76 | 95 | 79 |
| % DOI - Untreated | 70 | 39 | 75 | 8 |
| DE* - Treated | 0.5 | 4.1 | 1.7 | 0.9 |
| DE* - Untreated | 9.2 | 5.7 | 1.4 | 1.8 |

Example 4

One hundred grams of a titanium dioxide-coated mica having a blue interference color and containing 61% rutile TiO$_2$ with a median particle size of about 12 μm was dispersed in one liter of water at 65° C. The pH was adjusted to 4 with dilute nitric and then 60 ml of the 0.7% cerium solution and 60 ml of the 0.5% aluminum solution added at 6 ml/min. After stirring for 30 minutes, the pH was raised to 7.5 with an aqueous sodium hydroxide solution. The product was filtered, washed with distilled water and dried at 120° C. to yield a blue pearlescent pigment containing 0.4% Ce and 0.2% Al. Once again the improvement in stability was noted in the data from the % DOI and DE* measurements:

|  | LTWI | Q-C-T | Q-U-V | 80° C. |
|---|---|---|---|---|
| % DOI - Treated | 99 | 100 | 92 | 88 |
| % DOI - Untreated | 96 | 92 | 30 | 57 |
| DE* - Treated | 1.8 | 2.8 | 0.7 | 1.7 |
| DE* - Untreated | 3.2 | 15.3 | 1.8 | 13.2 |

Example 5

The procedure of Example 1 was repeated except that the initial pigment was a reddish brown colored iron oxide-coated mica containing 54% hematite and having a median particle size of about 12 μm. The improved stability was also exhibited by this iron oxide-coated mica pearlescent pigment containing 0.4% Ce and 0.2% Al:

|  | LTWI | Q-C-T | Q-U-V | 80° C. |
|---|---|---|---|---|
| % DOI - Treated | 80 | 99 | 82 | 58 |
| % DOI - Untreated | 71 | 96 | 78 | 22 |
| DE* - Treated | 0.7 | 2.5 | 2.6 | 1.4 |
| DE* - Untreated | 1.6 | 3.3 | 1.2 | 6.6 |

Examples 6 through 9

The procedure of Example 1 is repeated four times using the chloride salts rather than the nitrates and changing the concentration of the cerium and aluminum to 0.2% Ce, 1.3% Ce, 0.1% Al and 0.9% Al, respectively. The improved weatherstability results are also noted.

Examples 10 through 11

The procedure of Example 5 is repeated except that a 0.5% cerium solution of cerium sulphate and a solution of aluminum nitrate containing 0.2% aluminum, or a solution of 1.5% (as cerium) of cerium nitrate and 0.6% (as aluminum) of aluminum chloride are used. The improved weatherstability results are again noted.

Various changes and modifications can be made in the process and products of this invention without departing from the spirit and scope thereof. The various embodiments which were described herein were for the purpose of further illustrating this invention but were not intended to limit.

What is claimed is:

1. A titanium dioxide- or iron oxide-coated micaceous pearlescent pigment having a coating thereon consisting essentially of a combination of hydrated cerium and aluminum oxides.

2. The pearlescent pigment of claim 1 in which the coating contains about 0.1–1.5% cerium and about 0.1–1% aluminum based on the weight of the pigment which was coated.

3. The pigment of claim 2 in which both the cerium and aluminum amounts are individually within the range of about 0.2–0.6%.

4. The pigment of claim 3 in which the pigment coated is titanium dioxide-coated mica.

5. The pigment of claim 3 in which the pigment coated is iron oxide-coated mica.

6. The pigment of claim 1 in which the pigment coated is titanium dioxide-coated mica.

7. The pigment of claim 1 in which the pigment coated is iron oxide-coated mica.

8. A method of enhancing the weatherstability of a titanium dioxide- or iron oxide-coated micaceous pearlescent pigment which comprises forming a coating thereon which consists essentially of a combination of hydrated cerium and aluminum oxide.

9. The method of claim 8 in which the coating formed contains about 0.1–1.5% cerium and about 0.1–1% aluminum based on the weight of the pigment which was coated.

10. The method of claim 9 in which both the cerium and aluminum amounts are individually within the range of about 0.2–0.6%.

11. The method of claim 10 in which the pigment coated is titanium dioxide-coated mica.

12. The method of claim 10 in which the pigment coated is iron oxide-coated mica.

13. The method of claim 8 in which the pigment coated is titanium dioxide-coated mica.

14. The method of claim 8 in which the pigment coated is iron oxide-coated mica.

15. The method of claim 8 in which solutions containing the cerium and aluminum are added to the pigment and the pH is adjusted to cause precipitation.

16. The method of claim 15 in which the addition and precipitation are effected simultaneously.

17. The method of claim 15 in which the addition and precipitation are effected sequentially.

* * * * *